Oct. 1, 1929.                C. CRETORS                1,729,866
                         CORN POPPING APPARATUS
                          Filed Dec. 12, 1927          3 Sheets-Sheet 1

INVENTOR:
CHARLES CRETORS,
by Robert Burns
                ATT'Y.

Oct. 1, 1929.  C. CRETORS  1,729,866
CORN POPPING APPARATUS
Filed Dec. 12, 1927  3 Sheets-Sheet 2
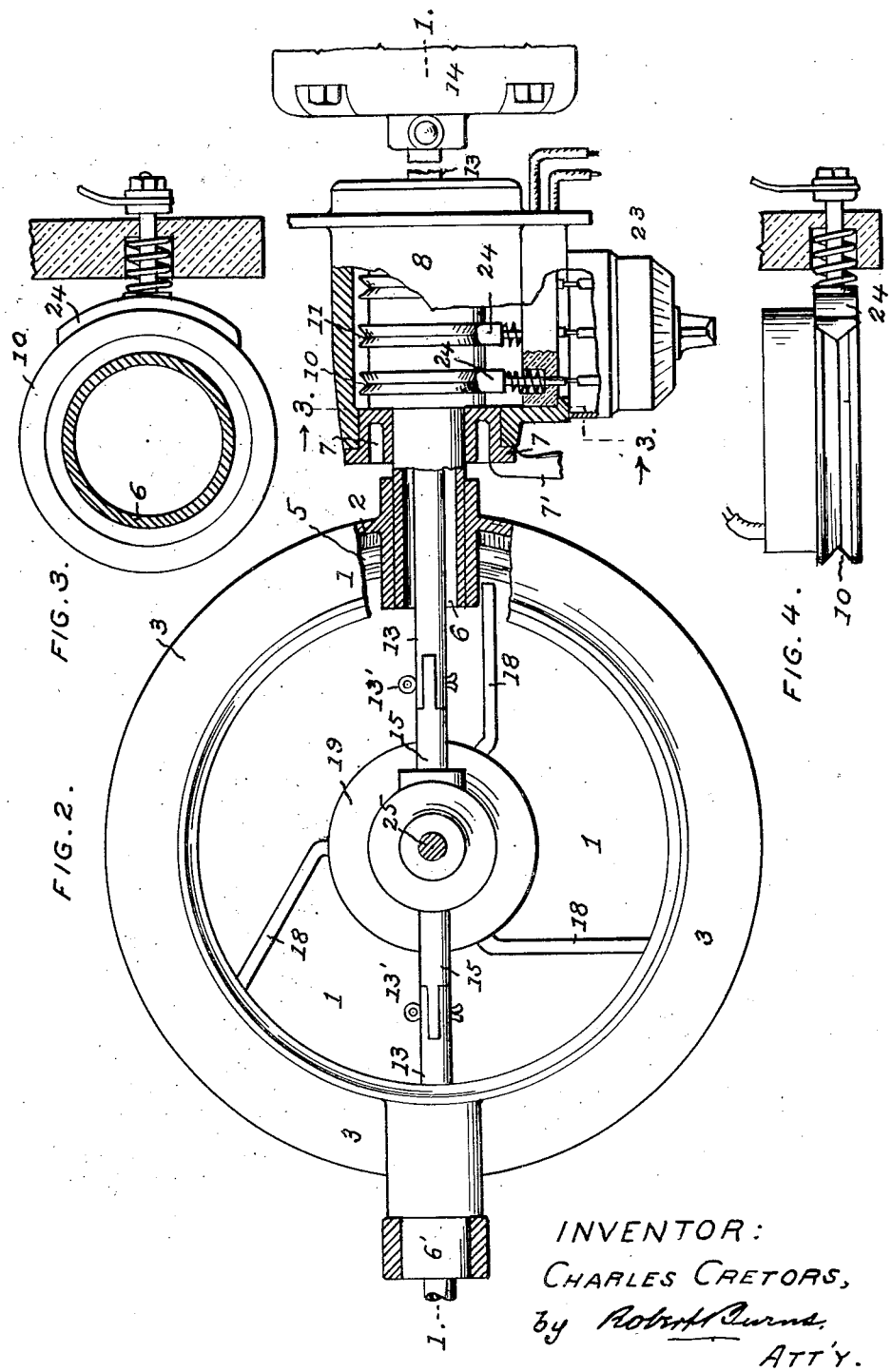

Oct. 1, 1929.    C. CRETORS    1,729,866
CORN POPPING APPARATUS
Filed Dec. 12, 1927    3 Sheets-Sheet 3
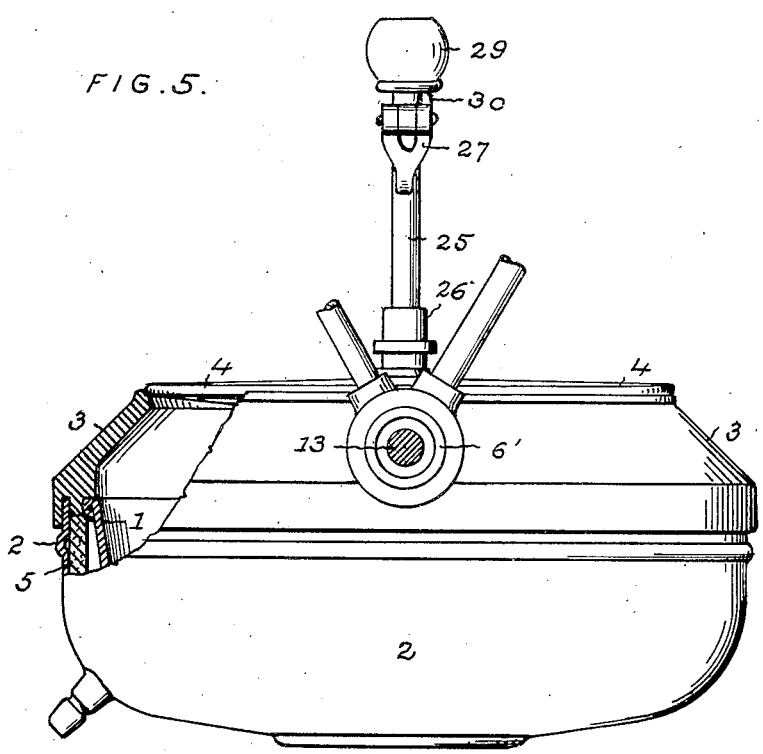
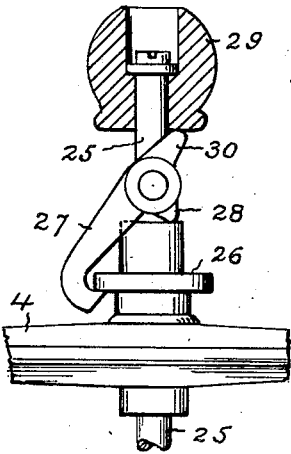
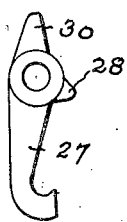
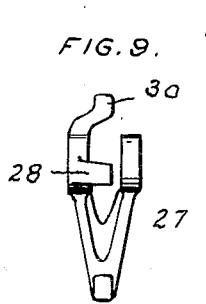
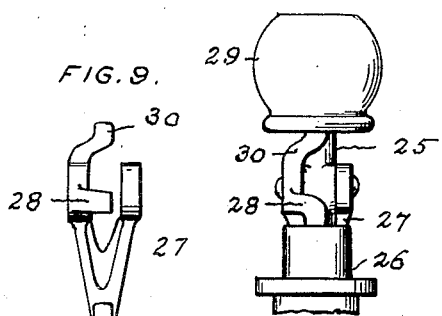
INVENTOR:
CHARLES CRETORS,
by Robert Burns
ATT'Y.

Patented Oct. 1, 1929

1,729,866

UNITED STATES PATENT OFFICE

CHARLES CRETORS, OF CHICAGO, ILLINOIS

CORN-POPPING APPARATUS

Application filed December 12, 1927. Serial No. 239,449.

This invention relates to that class of corn popping apparatus in which the popping pan is of a shallow open top form having a removable lid or cover, and provided with heating means arranged beneath the flat bottom of the pan. And more particularly to that type of the apparatus in which the popping pan and its accessories have an inverting or turning movement to effect a discharge of the popped corn from out of the pan at the end of a popping operation, an example of which is the subject matter of a prior Patent No. 1,201,807 dated October 17, 1919.

The objects of the present improvement are:

To provide a structural formation and combination of parts, in which the rotary stirrer blades or sweeps of the stirring means have their rotary carrying shaft, gear connection and driving shaft arranged in the upper portion of the popping pan chamber, remote from the heating element arranged beneath the bottom of the pan, so that but little if any lubrication of said mechanism is required in actual use, other than that supplied by the fat used in conditioning the material operated on.

To provide in connection with a popping pan of the above described type, an electrical heating means, comprising a plurality of annular resistance units of varied heating capacity and preferably two in number, which units in connection with a circuit changer of any ordinary and suitable construction, is adapted to attain a minimum, a medium and a maximum heating action at the bottom of the popping pan. And which in the preferred form of the apparatus includes in the electric circuits of the heating units, a plurality of fixed contact shoes or brushes and a like plurality of conducting rings fixed in an insulated manner on the journal sleeve of the popping pan and its supporting housing, in order to permit of an inversion of the pan, etc., without disturbance of the supply of electro-motive force to the heating units.

In the accompanying drawings:—

Fig. 2 is a plan view of the same, with the cover removed and with parts broken away and in section.

Fig. 3 is an enlarged detail section on line 3—3, Fig. 2 of the revolvable ring and contact shoe construction in the electric heating circuit.

Fig. 4 is a detail plan, partly sectionalized of the same.

Fig. 5 is an end elevation of the popping portion of the apparatus with part broken away and in section.

Figs. 6 and 7 are detail elevations at right angle relation, one to the other of the pan cover and its latching assessories.

Figs. 8 and 9 are detail elevations at right angle relation, one to the other of the latching hook of the cover mechanism.

Like reference numerals indicate like parts in the several views.

Figure 1:
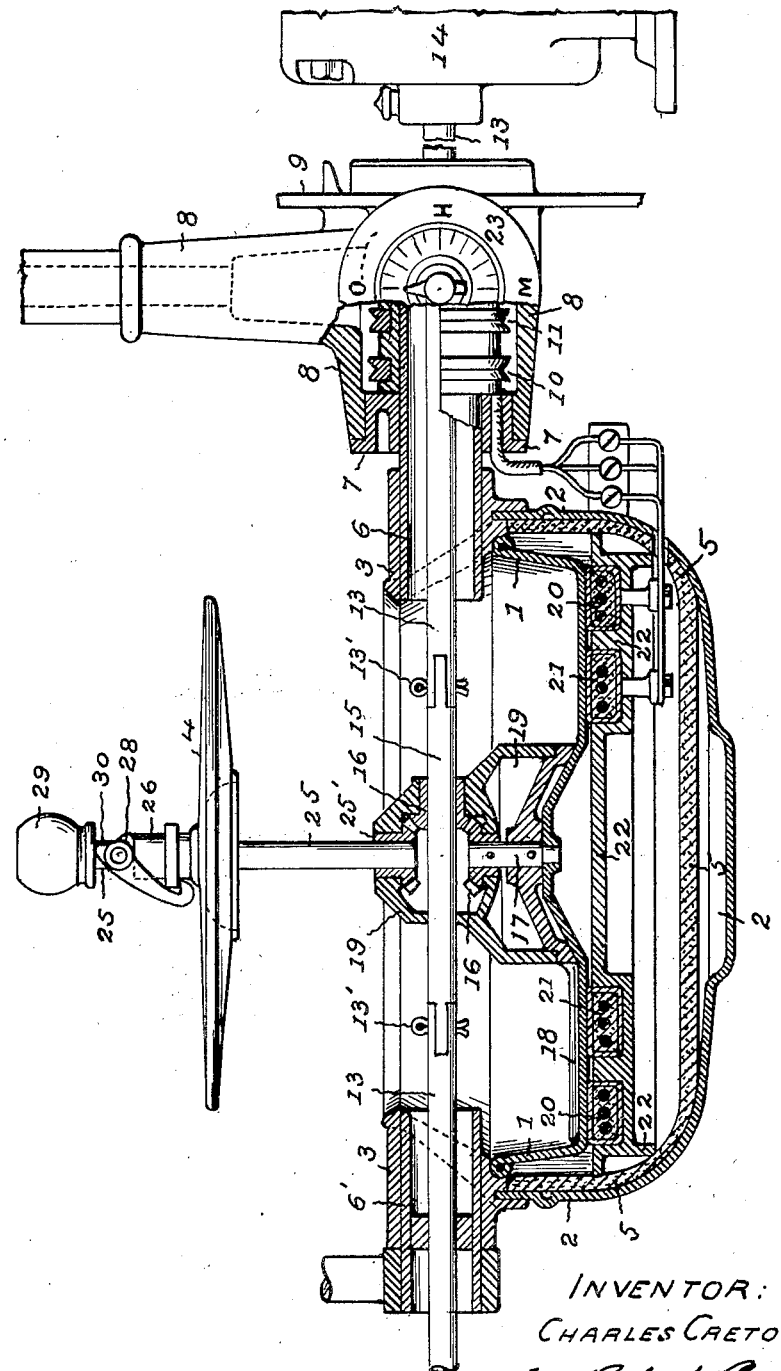
Fig. 1 is a longitudinal section in line 1—1 Fig. 2 of the preferred form of the invention.

In the present improvement the popping pan 1, with its accessories are revolvably supported on a stationary part of the apparatus, and are capable of a turning or inverting movement at the end of a popping operation, to discharge a batch of the popped corn from the pan. The turning or inverting movement being attained by hand or in an automatic manner as described in my aforesaid Patent No. 1,201,807.

In the preferred form of the invention the popping pan 1 is of a shallow open top form and is encased and supported in and by an enclosing shell or housing 2 in connection with a top member 3 of a truncated cone form, which is fixed to the top margin of the housing 2, to constitute a fixed centrally orificed top for the chamber of the popping pan 1. The above mentioned central orifice in the top member 3, is normally closed by a movable lid on cover 4 hereinafter described.

The enclosing shell or housing 2 is provided with a lining 5 of asbestos or like heat insulating material to prevent outward radiation of heat from the hereinafter described heating means for the popping pan.

A tubular sleeve 6 forming a fixed part of the aforesaid housing 2 extends on a radial line into the upper portion of the chamber of the popping pan 1, and extends away from said housing to form a journal bearing for said pan and housing. To such end the sleeve 6 is formed with a fixed annular hub 7 revolvably mounted in a lateral neck 8 of a tubular post or standard 9 forming a part of the stationary frame of the apparatus, and as shown more particularly in Figs. 1 and 2.

For the purpose of effecting a manual turning movement or inversion of the popping pan 1, and housing 2, the hub 7 aforesaid is provided with an operating handle 7' as shown in Fig. 2.

In addition to the annular hub 7, the tubular sleeve 6 carries in adjacent relation to said hub a pair of insulated contact rings 10 and 11, fixedly secured to said sleeve, and forming a part of the operating electric circuit supplying electro-motive force to the hereinafter described electrical heating units of the popping pan.

Centrally within the tubular sleeve 6, and extending diametrically across the chamber of the popping pan 1, a driving shaft 13 is revolvably supported, with one end connected to a power source, such as an electric motor 14.

Said driving shaft 13, is preferably formed in three aligned sections which are detachably connected together by interlocking tongue and groove and cotter pin connections 13' as shown in Figs. 1 and 2.

One of the outer sections of the aforesaid plurality of shaft sections has the above mentioned operative connection with the electric motor 14. The other of said outer sections has bearing in a secondary tubular sleeve 6' on the enclosing housing 2, and is extended away from said housing 2 for operative connection with a mechanism or device having associated relation with the present mechanism. The central section 15 of the plurality of shaft sections is journalled in the hereinafter described casing 19, and is operatively connected by a pair of bevel gears 16 with an upright shaft 17 arranged centrally of the popping pan 1 and carrying at its lower end the usual radial stirrer blades 18 that move in contact with the bottom of the popping pan 1, to stir or agitate the material being treated.

To prevent contact of the material undergoing treatment in the popping pan 1 with the stirrer carrying shaft 17, bevel gearing connections 16, etc., the enclosing casing 19 above referred to, is provided, and is arranged in the center of the popping pan to enclose and house said parts and at the same time provide an upper bearing for the stirrer shaft 16, as illustrated in Fig. 1.

In connection with the above described arrangement of parts, the before described sectional formation of the operating shaft 13, admits of a disengagement of the central shaft section 15 from the outer shaft sections, and a removal of the casing 19 and parts attached thereto, and including the central shaft section, from the chamber of popping pan, for cleaning, repairing and the like.

The heating means for the popper pan 1, is preferably of the electrical resistance type, and preferably comprising a pair of annular resistance units 20 and 21 arranged in spaced and concentric relation to each other and to the central point of the popping pan 1. As shown in Fig. 1, the annular units 20 and 21, are arranged in open top annular channels of a supporting base 22, which is in turn fixedly attached in the interior of the enclosing housing 2 of the pan 1 and adapted to maintain the heating units 20, 21, in close contact with the bottom wall of said pan.

The aforesaid resistance units 20, 21 are preferably two in number, with one unit having a greater heating capacity than the other unit, and both units are connected in multiple with a source of electro-motive force by suitable supply and return lines in which is arranged a circuit controlling switch 23, of any ordinary construction that is adapted to connect the electric supply to one or the other of the heating units 20, 21 singly, in the attainment of a minimum or an intermediate heating action beneath the popping pan 1, and which switch is adapted in addition to place both the heating units 20, 21 simultaneously, in the electric supply circuits to attain a maximum heating effect beneath the popper pan 1.

In the above described construction the heating units 20, 21 have a turning movement in unison with that of the popping pan 1, and enclosing housing 2, and in that it is desirable to maintain a constant electric supply to the units, the electric supply lines leading to said units lead to the heretofore described insulated contact rings 10 and 11, while the electric supply lines leading from the switch 23, have conducting contact with the aforesaid contact rings 10 and 11 by contact shoes or brushes 24, of any usual construction, preferably by means of shoes of a V shape form in cross-section, fitting and sliding in a correspondingly formed peripheral groove in each contact ring 20, 21, as shown more particularly in Figs. 3 and 4.

The heretofore described arrangement of the tubular sleeve 6, operating shaft 13, and bevel gears 15 in the upper portion of the chamber of the popping pan 1, is a material part of the present invention in that said parts are remote from the heating effects of the heating units 20, 21, as arranged beneath the popping pan 1. It has been found in extended practical use that such arrangement dispenses with the need of separate lubrication of the bevel gears 16 and other adjacent parts, in that the butter or like fats used as a conditioning means in the operation of popping corn will supply the proper amount of lubricant to said parts.

The closure head or cover 4 for the central opening at the top of the chamber of the popping pan 1, is of a circular form, and has movement to and from said opening, preferably in the semi-automatic manner described in my prior Patent No. 728,550 of May 19, 1903, upon a centrally arranged guide stem or post 25 that is journalled at its lower end in the upper end of the aforesaid casing 19, by a bevel gear wheel 25' which in turn gears with and is driven by the bevel gear wheel 16 on the driving shaft section 15 aforesaid.

With the mechanism in the position for effecting the popping operation, as shown in full lines Figs. 1 and 5, the closure header cover 4, moves into and is held in a closed condition by gravity alone, so as to admit of an upward movement of the cover by the expansion of the corn undergoing treatment as the popping operation progresses.

With the completion of the popping operation, and a semi-revolution of the popping pan 1, and its accessories, to attain a discharge of the finished product from the popping pan, the closure head or cover 4 aforesaid will move by gravity on the guide stem 25, into an open condition and with a view to maintain such cover 4 in such last mentioned open condition pending a discharge of the pan contents and a return of the pan, etc., to the above described popping position, a latching means is provided as follows:

The cover 4 is provided with a fixed annular collar 26 a short distance above its upper surface, adapted for engagement with a latch hook 27, pivoted on the aforesaid guide stem or post 25, to hold the cover in the open condition above referred to. The positive operation of said latch hook 27, to the described engagement is effected by a lateral lug 28 on said hook, which by contact with the adjacent end of the collar 26 of the cover 4, acts to move the latch hook 27 into the described engagement.

The release of the cover 4 from the above described engagement is effected by a knob 29 slidingly mounted on an end of the guide stem 25, with its lower end in operative contact with a cam extension 30 of the latch hook 27, so that with a downward movement of the knob 29, by the operator, a rocking movement of the latch hook 27 away from the collar 26 of the cover 4 is effected, as illustrated more particularly in Fig. 6.

The operation of the present apparatus is substantially the same as that of popping means set forth in my prior Patent No. 1,201,807 aforesaid, the variation therefrom involving a varied and controllable electrical heating means in which the preferred method of operation consists in starting the initial popping operation of the apparatus, both the electrical heating units 20 and 21 being placed in circuit with the source of electro-motive force by means of the switch 23 in order to attain a rapid initial heating of the popping pan 1, and associated parts. With the proper heating effect attained, and in the popping operations of the apparatus, the operating electric supply will be shifted to the medium heating unit 20, and then to the minimum heating unit 21, as the judgment of the operator may direct in obtaining the proper quality of the finished product and the speed of production of the same.

Having thus fully described my invention, what I claim and desire to secure by Letters Patent, is:—

1. In a corn popping apparatus of the type described, the combination of a revoluble popping pan formed with a laterally extending tubular journal sleeve adapted to afford a passage for the operating shaft of a stirrer in the popping pan, a fixed support having a bearing for said sleeve, and a heating element arranged beneath the bottom web of the popping pan in remote relation to said journal sleeve.

2. In a corn popping apparatus of the type described, the combination of a revoluble popping pan formed with a laterally extending tubular journal sleeve, adapted to afford a passage for the operating shaft of a stirrer in the popping pan, a fixed support having a bearing for said sleeve, a housing enclosing the lower part of the pan, and a heating element arranged beneath the bottom web of the pan in remote relation to said journal sleeve.

3. In a corn popping apparatus of the type described, the combination of a revoluble popping pan formed with a laterally extending tubular journal sleeve, adapted to afford a passage for the operating shaft of a stirrer in the popping pan, a fixed support having a bearing for said sleeve, a housing enclosing the lower part of said pan and having fixed association therewith, and an electrically energized heating element located in said housing in adjacent relation to the bottom of the pan.

4. In a corn popping apparatus of the type herein described, the combination of a revoluble popping pan formed with a laterally extending tubular journal sleeve adapted to afford a passage for the operating shaft of a stirrer in the popping pan, a fixed support having a bearing for said sleeve, an electrical heating means arranged beneath the bottom web of the pan, a pair of insulated contact rings in circuit with the electrical heating means and fixedly secured on the aforesaid sleeve, and companion contact brushes for said rings carried on the fixed support aforesaid for conducting electric current to the heating means.

5. In a corn popping apparatus of the type herein described, the combination of a revoluble popping pan formed with a laterally extending tubular journal sleeve adapted to afford a passage for the operating shaft of a stirrer in the popping pan, a fixed support having a bearing for said sleeve, an electrical heating means arranged beneath the bottom web of the pan, and comprising a plurality of annular electrical heating units, a pair of insulated contact rings in circuit with the electrical heating means and fixedly secured on the aforesaid sleeve, and companion contact brushes for said rings carried on the fixed support aforesaid for conducting electric current to the heating means.

In testimony whereof I hereto affix my signature.

CHARLES CRETORS.